Oct. 19, 1948.           J. F. PURDY           2,451,973
METHOD OF MAKING PNEUMATIC TIRES
Original Filed Aug. 8, 1942           3 Sheets-Sheet 1
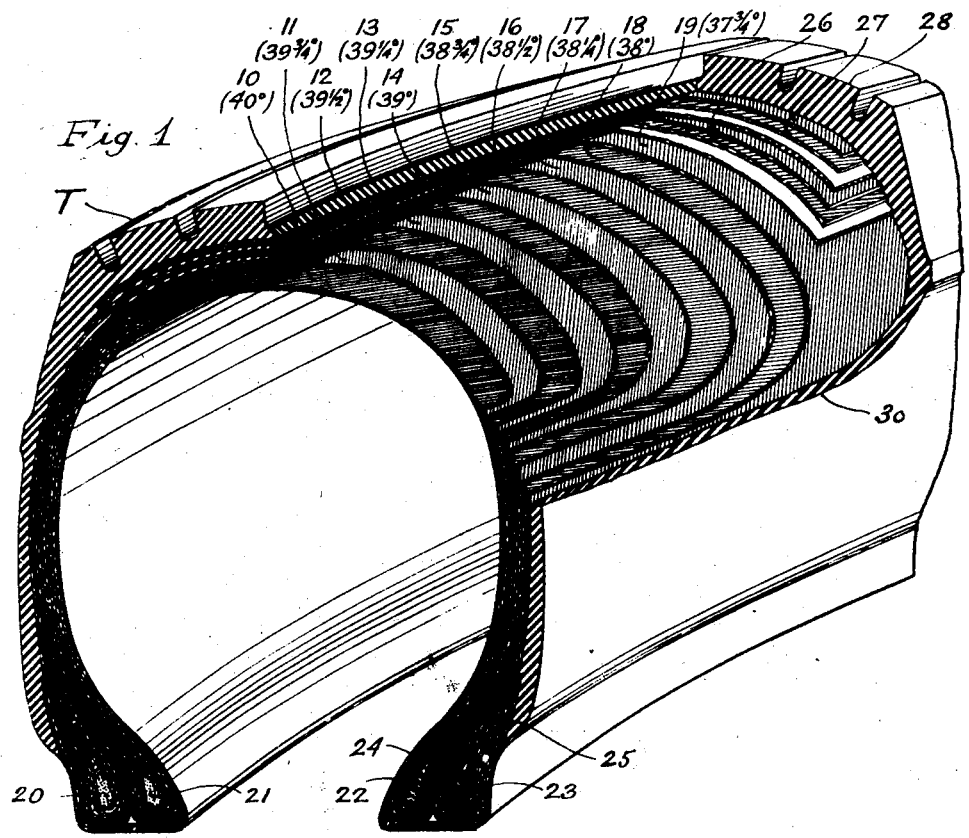
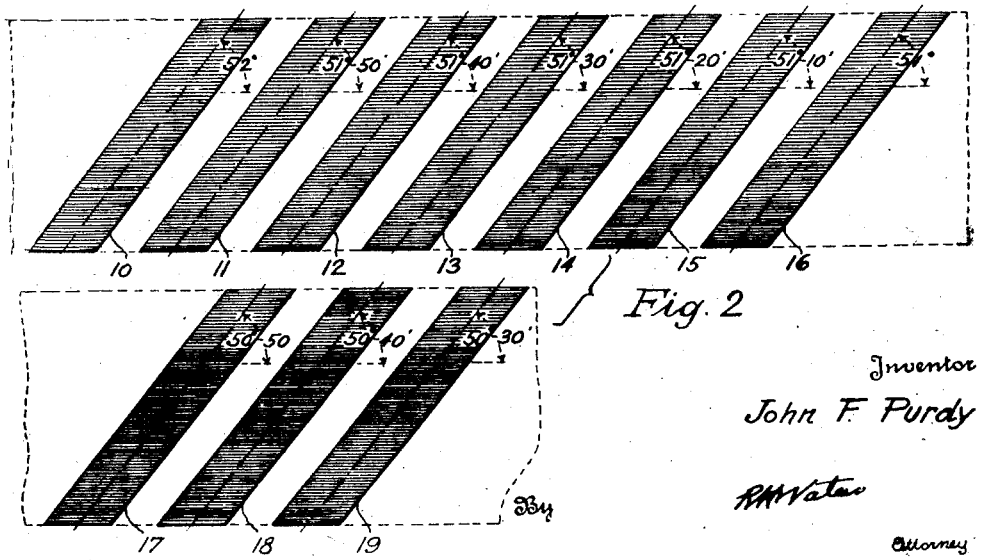
Inventor
John F. Purdy
Attorney Oct. 19, 1948.  J. F. PURDY  2,451,973
METHOD OF MAKING PNEUMATIC TIRES
Original Filed Aug. 8, 1942
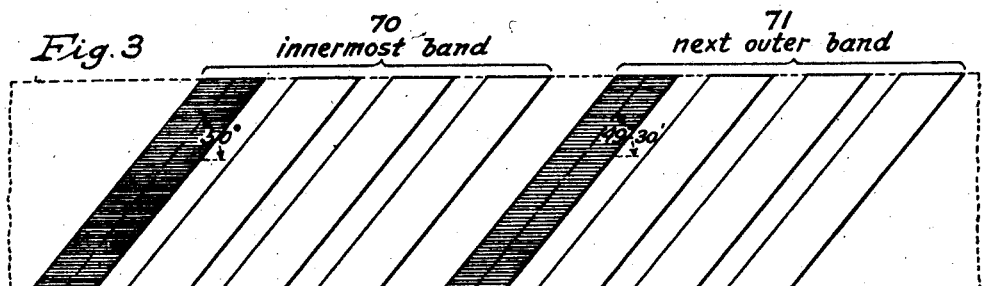
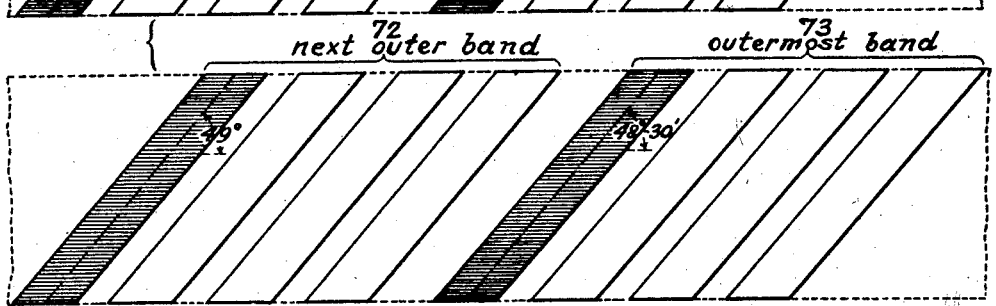
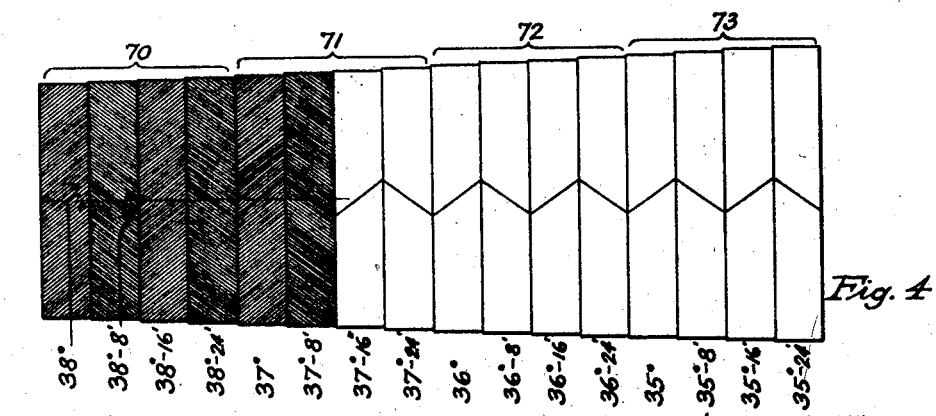
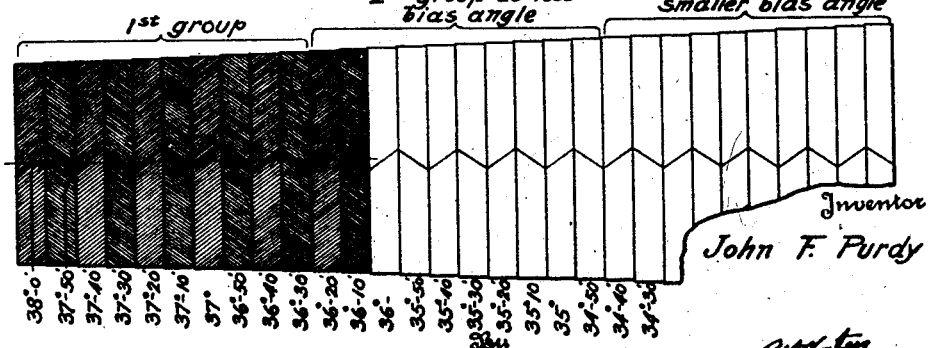

Oct. 19, 1948.   J. F. PURDY   2,451,973
METHOD OF MAKING PNEUMATIC TIRES
Original Filed Aug. 8, 1942   3 Sheets-Sheet 3
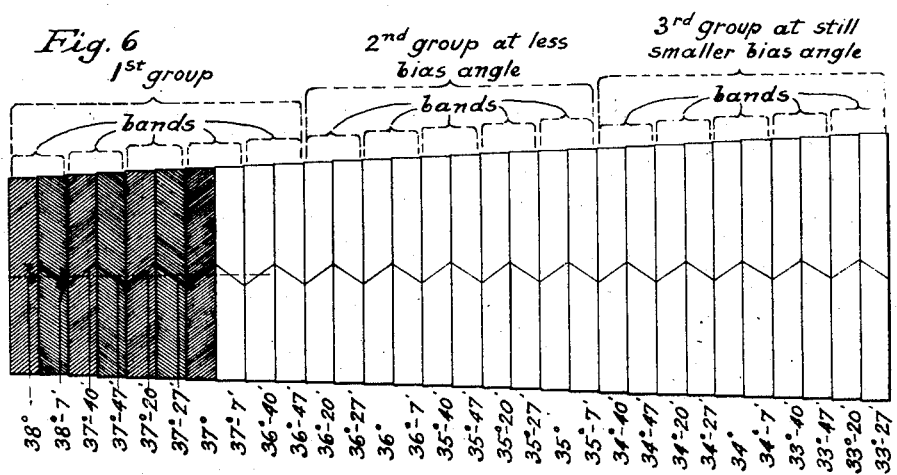
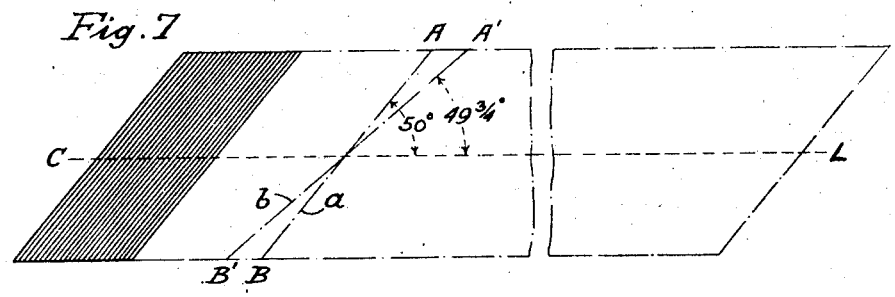
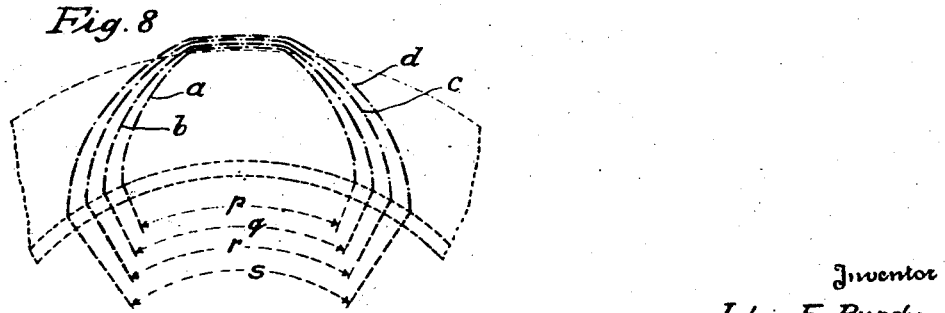
Inventor
John F. Purdy Patented Oct. 19, 1948

2,451,973

UNITED STATES PATENT OFFICE 2,451,973

METHOD OF MAKING PNEUMATIC TIRES

John F. Purdy, Cuyahoga Falls, Ohio, assignor to Wingfoot Corporation, Akron, Ohio, a corporation of Delaware Original application August 8, 1942, Serial No. 454,086. Divided and this application January 30, 1945, Serial No. 575,257

8 Claims. (Cl. 154—14)

This invention relates to methods of making pneumatic tires, and, more particularly, is concerned with methods of building pneumatic tires of a plurality of rubberized cord fabric plies to have the cords of all the plies of the tire subjected to substantially uniform tension when the tire is in use.

For many years it has been recognized that it is highly desirable to have uniform ply cooperation in a pneumatic tire. As early as 1904, Patent No. 778,496 was granted to A. H. Marks disclosing a tire carcass built from a plurality of plies of fabric, with the innermost ply cut at a bias angle of 45 degrees and each succeeding ply cut to a greater angle with respect to the great circle of the tire to thereby assertedly decrease the elasticity of each succeeding ply and provide uniform stress in the several plies of the tire. Patents No. 1,374,505 and 1,493,674 to Ernest Hopkinson are also concerned with assertedly providing uniform ply cooperation throughout a pneumatic tire, and Hopkinson, like Marks, taught the idea of increasing the angle between the cords and the great circle of the tire outwardly of the plies of the tire. Again, Elliot Patent No. 2,225,042 is concerned with the same problem of providing uniform tensioning of the cords of the various plies in a tire carcass, and discloses and claims the idea of employing a plurality of groups of plies, each group having a pair of adjacent plies with cords running in the same direction and used in cooperation with a second pair of adjacent plies having parallel cords but extending in an opposite direction to the cords of the first set of plies.

Although it has been recognized by others that uniform cooperation among the plies of a pneumatic tire is desirable, the methods proposed by others have not provided uniform cooperation among the plies of a tire in use.

It is well known that in a thick-wall cylinder an internal pressure causes a greater stress in the inner fibers than in the outer fibers. In the case of a hollow toroid, such as a pneumatic tire, the same effect exists. I have discovered that the tension in the cords of a pneumatic tire due to inflation pressure depends upon the angle at which the cords cross the plane of the great circle of the tire. Under the same inflation pressure the cords of smaller angle are under greater tension, and cords of larger angle are under lesser tension.

My invention therefore describes the methods of building a pneumatic tire in such a way that the cord angle of the several plies decreases radially outwardly among the plies, and in such a way that the decreasing pressure load on the successive plies outwardly of the tire will result in the same cord tension in all the plies.

The prior art described by others uses the same bias angle in all the plies of the tire, or bias angles cut at larger angles outwardly among the plies, so that, in either case, the cord angle in the cured tire increases outwardly among the plies and thereby causes the tension in the cords to decrease outwardly among the plies and to accentuate, rather than improve, the cooperation among the plies.

The methods described by others of using but one bias angle for all plies and a cord angle increasing outwardly among the plies of the finished tire, may not have given rise to objectionably non-uniform stresses in thin-walled tires of, say, 4 or 6 plies. In the construction of tires of a greater number of plies than 4 or 6, the non-uniform tension in the cords of the successive plies does become increasingly objectionable as greater numbers of plies enter the construction of a tire.

It is the general object of my invention to avoid, and overcome, the non-uniform stresses of tension, and shear in the carcass of a tire that result from building according to the known suggested prior art practices, and to build a tire having substantially uniform tension in the cords of all the plies and a substantially uniform shear stress between all the plies of the tire.

Another object of my invention is to provide methods of building a pneumatic tire having uniform tension and shear and substantially uniform cooperation among all the plies of the tire when inflated and in use.

Another object of my invention is to provide methods of building a pneumatic tire from a plurality of rubberized cord fabric plies, in which the cord angle is so closely controlled that in all cases the cord tension in the cured and finished tire will be that which is considered as optimum for the material used in the construction of the tire, and that no ply will be either over-tensioned or under-tensioned but all substantially equally tensioned when the tire is in use.

The foregoing objects of my invention, and other objects which will become apparent as the description proceeds, are achieved by the provision of a pneumatic tire including a plurality of rubberized cord fabric plies, and with the angle between the cords of each ply and the great circle of the tire being greatest in the innermost ply, and progressively, or periodically recurrently less in the radially outwardly positioned plies. Again the principles of my invention may be achieved by a pneumatic tire casing comprising a carcass composed of a plurality of plies of rubberized cord fabric, the circumferential distance between the ends of the cords in an inner ply being less than the circumferential distance between the ends of the cords of any superimposed ply.

Or, stated in terms of method, my invention consists of placing the successive layers, or plies of rubberized cord fabric on the building core in such a way that the cords of each successive ply lie at an angle on the building core that will be transformed by shaping from building core to curing mold to an angle in the cured tire that will provide substantially the same tension in the cords of all the plies when the tire is in use.

For a better understanding of my invention, reference should be had to the accompanying drawings wherein Fig. 1 is a perspective view of a section of one embodiment of a pneumatic tire constructed in accordance with my invention, and with parts thereof being broken away in steps; Fig. 2 is a diagrammatic plan view of the manner in which the plies of rubberized cord fabric are cut from a length of cord fabric; Fig. 3 is a view similar to Fig. 2 but illustrating the manner of cutting a plurality of plies on the same angle to form a band, and cutting a plurality of other plies on a different angle to form an additional band or bands; Fig. 4 is a diagrammatic showing of a stepped-down tire section built from the plies of Fig. 3; Figs. 5 and 6 are similar to Fig. 4 but illustrate other embodiments of my invention; Fig. 7 is a diagrammatic plan view of a ply of rubberized cord fabric illustrating the angle of the cords therein; and Fig. 8 is a diagrammatic side elevation of a section of a finished tire illustrating the position of the cords in the several plies thereof.

Referring to the drawings, the letter T indicates generally one form of a pneumatic tire constructed in accordance with the principles of my invention. Specifically, the tire T includes superimposed plies of rubberized cord fabric 10, 11, 12, 13, 14, 15, 16, 17, 18, and 19. The fabric of each ply may be of the well known weftless or pickless type, having the load bearing cords all extending in one direction, and with the individual cords being held together only by the rubber skim or friction coating. Again, the fabric of each ply may be of the well known type in which the load bearing cords, usually called warp cords, extending in the same direction, are held together by light weight weft or pick threads at spaced points. Therefore, the term cord fabric as employed here and in the claims is intended to include either of the two fabric types just described, or modifications thereof. Usually, each of the plies extends from edge to edge of the tire carcass, and the side edges of the plies are positioned around inextensible bead portions 20, 21, 22, and 23 in the tire embodiment illustrated, and with bead flipper and chafer strips 24 and 25 being employed in known manner. Any usual breaker means 26 and 27 may be incorporated with the tire carcass on the periphery thereof, and the tire is provided with the usual tread portion 28 and rubber side walls 30.

Now in accordance with the principles of my invention, each one of the plies 10 to 19 of the tire T is cut from a rubberized cord fabric strip at a progressively lesser bias angle (see Fig. 2), namely, ply 10 is cut at an angle of 52° between the cords and the center line of the ply, ply 11 is cut at an angle of 51°50' between the cords, and the ply center line, ply 12 is cut at an angle of 51°40' between the cords and the ply center line, ply 13 is cut at an angle of 51°30' between the cords and the ply center line, ply 14 is cut at an angle of 51°20' between the cords and the ply center line, ply 15 is cut at an angle of 51°10' between the cords and the ply center line, ply 16 is cut at an angle of 51° between the cords and the ply center line, ply 17 is cut at an angle of 50°50' between the cords and the ply center line, ply 18 is cut at an angle of 50°40' between the cords and the ply center line, and ply 19 is cut at an angle of 50°30' between the cords and the ply center line. The result is that the angle between the cords of each ply in the cured tire and the great circle of the tire decreases radially outwardly of the several plies of the tire. More specifically, and referring to Fig. 1 of the drawings, ply 10 for a given tire, for example a 9.00 x 20 tire, has a cured tire cord angle, i. e. the angle between the cord and the median plane or great circle of the cured tire, of 40 degrees. Ply 11 has a somewhat lesser angle, for an example, an angle of 39¾ degrees, ply 12 has a still smaller angle, for example 39½ degrees, and plies 13 to 19 have angles of 39¼, 39, 38¾, 38½, 38¼, 38, and 37¾ degrees respectively. Thus, a tire structure is provided in which the cords of each ply have a lesser angle with the great circle of the tire in each radially outwardly positioned ply.

It will be noted that the cord angles indicated in Fig. 2 do not correspond to the angles of the same plies in Fig. 1, the reason being that the bias angles of the cut cord-fabric plies of Fig. 2 would still appear or be substantially the same in the flat built, or pulley band tire carcass, but when the flat built carcass is shaped to toric form (that in which it is vulcanized) the shaping of the tire changes the ply angles. It will be understood that for the last twenty years, approximately, tires have been built upon a drum having a surface parallel to the drum axis and of a diameter only slightly greater than the diameter of the tire beads. The plies are laid on the building drum flat, with the edges of the plies being wrapped around the beads, all of which greatly simplifies and speeds the building operation over previously known methods of building on a toric form. The flat pulley band produced on the flat building drum is removed from the drum and is placed in or on mechanical or differential air pressure mechanism which forms the flat pulley band to toric shape, that is, true tire shape. In this shaping operation, the cords of the plies pantograph, and change their angles, all in a manner well understood by the person skilled in the art. The shaped tire is then vulcanized.

It is true that in the shaped tire, and in the vulcanized tire, the cord angle varies from the great circle of the tire down to the beads, the cord following a curved path. However, as herein stated, the ply angle referred to is always the angle between the cords of each individual ply and the great circle of the tire, which is at the center of the tread. Reference to the bias angle is made when it is intended to refer to the angle between the cords and the center line of the ply itself before it is assembled into the tire carcass. Thus, Figs. 2 and 3 show bias angles of the cords in the plies, and Fig. 1 shows cord angles in the finished tire.

When assembling the plies on the building form it is often convenient first to assemble two or more plies into a band and place the successive bands on the building core.

Very often I find that the bias angles need not be decreased for every ply but only at intervals outwardly of the tire carcass. For example, I may make the first two plies from cord fabric cut at the same bias angle, then two plies cut at a smaller bias angle, and so on for use outwardly of the tire. In some cases I may cut four plies at the same bias angle, four more at a lesser bias angle, and so on for use radially outwardly of the tire.

It should be understood that when forming bands in which two plies, or in some cases four plies, are cut at the same bias angle, in the cured tire the angle of the cords will increase outwardly among the plies of the band, and in the cured tire the tension will increase outwardly among the plies of the bands. However, by changing the angle at which the plies of successive bands lie on the building core, a cord angle recurrently less radially outwardly among the plies is established and this practice provides tension in the cord of the plies of the cured tire in use that are substantially uniform within the limits considered optimum of the fabric used.

It is to be understood that the choice of cutting each ply at a different bias angle, or the use of two ply bands, each ply being of the same bias angle; or the use of four ply bands, each ply being at the same bias angle; and changing the bias cut angle from band to band, or of changing the pull-on stretch from band to band (as hereinafter described) is made in any case by the degree of uniformity required to obtain best service from any material used. It is also to be understood that the use of the same bias angle in a two ply band, and in some cases a four ply band, but changing bias angle from band to band, or varying the pull-on stretch from band to band, does in any case permit a much more uniform tension in the cords of the cured tire than would be possible by using the same bias angle in all plies, or bias angles increasing outwardly among the plies as taught by the prior art.

Referring to Fig. 3 of the drawings, I have therein illustrated diagrammatically the arrangement of the plies of a sixteen ply tire, for example a 16.00 x 24 tire. The first four plies 70 of the tire, forming the innermost plies of the tire carcass, are cut from rubberized cord fabric on a bias angle of approximately 50 degrees. These first four plies are formed into a band, with adjacent plies of the band positioned with the cords extending at equal but opposite angles to the great circle of the tire in the same way that the plies are usually assembled in a standard tire building operation. I have found it convenient to form the band from the four plies in a separate building operation and to thereafter position the completed band on a tire building form where the complete band is handled substantially as a single ply, and in known manner.

The next four plies 71 of the tire are cut on a bias angle of approximately 49½ degrees, and these four plies are formed into an individual band which has been designated in the drawing as the next outer band, and which is then built onto the tire carcass. The next four plies 72 are cut on a bias angle of approximately 49 degrees and are also formed into a band which is built onto the tire carcass. The last four plies 73 are cut on a bias angle of approximately 48½ degrees and are also formed into a band which is built onto the tire carcass in the usual way. It will be understood that in the finished tire carcass the several plies forming the same are usually positioned with the rubberized cords of every other ply extending in the same general direction, and adjacent plies having the cords extending in opposite directions.

It will be recognized that when I decrease the angle between the ply cords and the great circle of the tire every two or four or more plies, as last described, the plies of the tire lying between the innermost ply of one band and the innermost ply of the next outer band may contain cords lying on an increased angle with the great circle of the tire.

Although a strictly uniform angle gradient in the finished tire is desirable, the use of bands of two plies, each of which are cut at the same bias angle, or the use of bands of four plies, each of which are cut at the same bias angle, may replace the use of single plies each cut at a different bias angle if the resulting cord angles in the cured tire will be such that the non-uniform angle gradient in the carcass gives rise to cord tensions which differ so little as to always remain within the optimum range of tensions of the material of which the plies are made.

For example, in the specific example of tire structure and bias angle change last given, the cured tire cord angle of each ply from the innermost outwardly may be substantially: 38°, 38°8′, 38°16′, 38°24′, 37°, 37°8′, 37°16′, 37°24′, 36°, 36°8′, 36°16′, 36°24′, 35°, 35°8′, 35°16′, 35°24′. Fig. 4 diagrammatically illustrates this construction.

An important part of my invention is the provision of a method of controlling the cord angle in the cured tire separately from, or in conjunction with the use of more than one bias angle as heretofore described. The desired cord angle in the cured or finished tire may be obtained by building bands of rubberized cord fabric of two, or sometimes of four plies, such bands being built on a separate band building apparatus and then stretched circumferentially onto the tire building form. The cord angle of the plies of a band changes as the amount of circumferential stretch changes, so that I may use the same bias angle in the corresponding plies of successive bands, and by making the successive bands shorter and thereby increasing the circumferential stretch when assembling the successive bands on the building form, I am able to establish in the shaped tire an angle gradient from larger angle in the first ply to smaller angle in the last ply as required for uniform tension in the cords of all the plies. This change in pull-on stretch is one of the several variables referred to above in the general discussion of applicant's invention.

The bands of two plies or of four plies may have each of the plies in the band cut at a different bias angle with the ply of largest angle being the first of the plies of the band, the ply with the next larger angle being the second ply of the band, and so on until the band is completed. The next band may then have plies each of which is cut at a different bias angle but the same as that of the corresponding ply in the preceding band. The second band is applied to the building form with greater circumferential stretch than the first band. This procedure may be continued until all the bands are assembled on the building form.

In cases in which the required limits of uniformity of cord tension and shear in the plies of the cured tire is such that the angle of the cords need not change uniformly from ply to ply, I may build the successive bands of two plies or sometimes of four plies, using the same bias angle for all the plies of one band. On the second band of the same tire I may cut all plies at the same bias angle. On the second band the bias angle of the plies may be the same as that used for the plies of the first band, in which case the second band is applied to the core with greater pull-on stretch than the first band. Or again, I may use a different and smaller bias angle for all the plies of the second band than was used for the plies of the first band, in which case the normal or usual pull-on stretch is used.

In all cases the choice of bias angle and of pull-on stretch is made in such a way that the cord angle of the plies when assembled on the building and also in the cured and finished tire will be smaller from inner ply to outer ply, or recurrently smaller, but in all cases the cord angles in the cured and finished tire will be such as to provide substantially uniform tension in all the cords of all the plies.

In a typical tire structure relying solely on bias angle change in each ply, the cured tire cord angles may be respectively from the innermost ply outwardly approximately 38°, 37°50′, 37°40′, 37°30′, 37°20′, 37°10′, 37°, 36°50′, 36°40′, 36°30′, 36°20′, 36°10′, 36°, 35°50′, 35°40′, 35°30′, 35°20′, 35°10′, 35°, 34°50′, 34°40′, 34°30′, 34°20′, 34°10′, 34°, 33°50′, 33°40′, 33°30′, 33°20′, 33°10. Fig. 5 illustrates diagrammatically such a tire construction, and wherein a substantially uniform reduction gradient in cured tire cord angle is achieved throughout the tire outwardly of the plies. On the other hand when using two ply bands and a combination of bias angle change plus progressively greater pull-on stretch, the cured tire cord angles counting outwardly among the plies may be approximately as follows: 38°, 38°7′, 37°40′, 37°47′, 37°20′, 37°27′, 37°, 37°7′, 36°40′, 36°47′, 36°20′, 36°27′, 36°, 36°7′, 35°40′, 35°47′, 35°20′, 35°27′, 35°, 35°7′, 34°40′, 34°47′, 34°20′, 34°27′, 34°, 34°7′, 33°40′, 33°47′, 33°20′, and 33°27′. This construction is illustrated diagrammatically in Fig. 6.

The same reduction gradient illustrated in Fig. 6 can be obtained solely by bias angle change from band to band, or solely by progressively greater pull-on stretch, or by a combination of bias angle change and pull-on stretch. In conjunction with the use of progressively greater pull-on stretch alone or in combination with bias angle change, I preferably, but not necessarily, employ mechanical or other stretching means to pre-stretch the band before it goes to the tire builder so that the pull-on stretch in the building operation will be kept uniform.

It would be well to note here the sharp distinction that should be drawn at all times between bias angle (namely the angle between the ply cords and the center line of the ply as cut) and cured tire cord angle (above defined). It is true that these angles bear a distinct relation to each other and means are known for determining the one from the other. In Fig. 7 I have diagrammatically shown a ply of rubberized cord fabric cut on a bias, with the bias angle between a given cord AB in the ply and the center line CL of the ply being 50 degrees. This ply will be, for example, the innermost ply in a tire carcass. The next radially outer or superimposed ply will be cut on a smaller bias angle, for example, the position of the rubberized cord in the second ply of fabric is indicated by the line A′B′ and the angle is an angle of say 49¾ degrees.

When the ply fabric illustrated in Fig. 7 is applied to a tire building form and is built into a tire, which is subsequently shaped to toroidal form and vulcanized therein, the cord will take substantially the position illustrated in Fig. 8 of the drawings by the dot and dash line indicated by the letter $a$, and the circumferential distance between the ends of the cord becomes a distance $p$ at the points of the tie-in of the cord with the beads of the tire. A cord $b$ in the next outward or superimposed ply of fabric, cut on a smaller bias angle as described in the next proceeding paragraph, will take substantially the position shown in Fig. 8 of the drawings, and the distance between the ends of the cord $b$ at the bead tie-in is substantially a distance $q$. A cord $c$ in the next radially outward ply of fabric, cut on a still smaller bias angle, takes the position shown in Fig. 8, and the circumferential distance between the ends of the cord $c$ at the point of bead tie-in becomes a distance $r$. A cord $d$ in the next outer ply, cut on a still smaller bias angle, takes a position as illustrated in Fig. 8, and the circumferential distance between the ends of the cord $d$ at the region of the bead tie-in becomes a distance $s$. It will be seen that $s$ is greater than $r$, $r$ is greater than $q$, and $q$ is greater than $p$, so that, in describing my advance in the art, I may say that the circumferential distance between the bead tie-in of the rubberized cords in the several plies in a tire constructed in accordance with my invention increases radially outwardly of the plies of the tire, with the change being made in each ply or every two or more plies in successively outwardly positioned plies. And this is true whether the cord angle change is due to a progressive decrease in bias angle in the plies, due to a progressively greater pull-on stretch in the plies, or due to a combination thereof.

By way of an example of bias angle changes to achieve the objects of my invention, when building a tire of a size 24.00 x 32 and of thirty-two ply construction, the first band of four plies may have a bias angle of 60 degrees, the second band of four plies a bias angle of 59½ degrees, and succeeding bands, each of four plies, may have bias angles of 59, 58½, 58, 57½, 57, and 56½ degrees respectively.

A specific commercial application of the principles of my invention entailing a minimum of production complications comprises building a 24.00 x 32 tire of thirty-six ply construction, and wherein the first eighteen plies are cut on a bias angle of 62½ degrees and made into two-ply bands of the same length, namely 133.12 inches. Thus, each of the two-ply bands will be applied with greater pull-on stretch. The last eighteen plies are cut on a bias angle of 60 degrees and made into two-ply bands of the same length, namely 142.4 inches. Each of the last nine two-ply bands are applied with greater pull-on stretch.

Again, in a commercial embodiment of a 16.00 x 24 tire of twenty plies, the first ten plies may be cut on a bias angle of 57½ degrees. The plies are built into two-ply bands, with the first three bands being made of the same length, namely 109 inches long, and applied with progressively greater pull-on stretch. The next two bands are made 108 inches long, and are applied with greater pull-on stretch. The next ten plies are cut on a bias angle of 55 degrees and made into two ply bands. The first two bands are made of the same length, namely 114 inches, and are applied with progressively greater pull-on stretch. The last three bands are made of a shorter length, namely 113 inches, and are applied with progressively greater pull-on stretch.

So far as the exact cured tire cord angle is concerned, I have found that, if the cured tire cord angle for the innermost ply of any given tire is selected in accordance with past experience or by any known methods, then the cured tire cord angle for each superimposed ply should be between about 5 and 25 minutes less than the cured tire cord angle of the next inner ply, and usually about 10 or 12 minutes less. On occasions, I have found it advisable to provide somewhat greater cord angle changes or gradients between plies, for example, up to 40', or slightly more for specialized constructions that may sometimes be required to be built. With heavy plies, the angle may be decreased closer to 25 minutes and with thin plies closer to 5 minutes. The most important factor is surface curvature, and when the surface curvature of the tire carcass is small, the gradient is usually nearer to 5', and when the surface curvature is large, the gradient is usually nearer to 25'. Cured tire cord angle changes within the indicated limits have been proven to give much more uniform ply cooperation and uniform cord loading over a wide range of tire sizes than has been achieved prior to my invention.

Or in terms of bias angle change, I have found that, if the bias angle for the innermost ply is selected in accordance with past experience or by any known methods, then the bias angle for each superimposed ply should be between about 2 and about 15 minutes, and in extreme cases up to 30', less than the bias angle of the next inner ply. With heavy plies or large surface curvatures, the angle may be closer to 15 minutes, and with thin plies or small surface curvatures closer to 2 minutes. Of course, when, because of production limitations, the bias angles of the various plies are advisably changed as groups or as bands, as above described, the change of bias angle in each band will be approximately the number of plies in the band times the decrease in angle for each ply as set forth in this paragraph.

It should be noted here that I am not more specific except in the examples given, as to the cured tire cord angle or the bias angle of the innermost ply, because my invention of uniform ply cooperation is not limited to any specific value or range of the cured tire cord angle or to the bias angle of the innermost ply. A completed tire embodying the principles of my invention may have an average or mean cord angle, large or small. In this respect, it is old and well known that in some tires it is advisable to have a low cured tire cord angle, i. e. angle down to 25 degrees or less. Again, by keeping the cured tire cord angle high, i. e. up to 60 degrees or more, a tire of a different characteristic is produced. The choice of representative or average angle in the tire is made from consideration of the service the tire is required to perform. But in any event, and regardless of the service requirements which determine the cured tire cord angle of the innermost ply, my invention is concerned with controlling and adjusting the cured tire cord angles along a gradient about any mean or average angle such that substantial uniformity of tension will be obtained in all plies.

It should furthermore be noted that on shaping a tire from the building form to the molded or finished form it is desirable to place an increment of tension in the cords. In order that the tension in the cured tire in service be uniform among the cords of the several plies, it is necessary that the shape-change from core to mold places or results in an increment of tension uniformly in the cords of the several plies. It is also well known to those familiar with the art that the cord angle change from that of the cords on the building drum to that of the cords in the cured or finished tire is influenced by the tension placed in the cords on shaping from core to mold. It is therefore an important part of my invention that having determined the cord angle in the tire that results in uniform cord tension in all the plies, and the bias angles and pull-on stretches that will result in the preferred finished tire cord angles, the shape of the building form can then be determined so that the relative length of the cords of each ply will be the same on the building core and in the mold, and the necessary condition thereby provided for imparting a uniform increment tension to the cord when shaping from core to mold.

I have found that when pneumatic tires are built in accordance with the principles herein disclosed and on proper building forms that the tension placed in the cords by shaping from building form to molded shape is substantially uniform. The amount of blow-up or shaping tension desirable is determined in any case by the characteristics of the fabric of which the plies are made, and the desired amount is obtained generally by adjusting the width or shape of the building form. My invention is particularly adapted to the manufacture of pneumatic tires having a very considerable plurality of plies and built from low stretch fabric.

Supplementing the explanation of the term "cord angle" as employed in the specification and claims this is intended to define the angle between the cords of a ply and the great circle of the tire lying in a plane normal to the axis of rotation of the tire. Further, the words "superimposed ply" or "superimposed band" utilized in the specification and claims are intended to mean a ply, plies, a band, or bands which are radially outside of previously recited ply, plies, band, or bands with or without being in direct contact therewith. In other words, the principles of the invention are not to be defeated or avoided merely by interposing a breaker strip or false ply or plies in the construction of a tire while following the basic teaching of this disclosure.

It will be understood that the term "cord fabric" as utilized in the specification and claims is intended to include weftless fabric, very thin and spaced weft cord fabric, or other cord fabric utilized in pneumatic tire construction, and the term "rubberized" is to include natural or synthetic rubbers or plastics capable of use in pneumatic tire construction.

This application is a division of my application Serial No. 454,086, filed August 8, 1942, now Patent 2,432,630.

Therefore, the various specific tire examples, bias angles and cured tire cord angles shown in the drawings and above described are by way of illustration only of the principles of my invention, and it should be particularly understood that I am not to be limited thereto or thereby, but that the scope of my invention is defined in the appended claims.

I claim:

1. The method of building a pneumatic tire which includes the steps of cutting rubberized cord fabric into a plurality of plies, assembling the plies into a band, building the band on a tire building form, cutting a plurality of plies of rubberized cord fabric on a smaller bias angle than the first-named plies, assembling the plies into a second band, building the second band on the building form over the first-named band, cutting a plurality of plies of rubberized cord fabric on a still smaller bias angle than the first and second-named plies, assembling the plies into a third band, building the third band on the building form over the second-named band, and repeating this operation until the desired number of plies are assembled.

2. The method of building a pneumatic tire which includes the steps of cutting rubberized cord fabric into a plurality of plies, assembling the plies into a band, building the band into a tire carcass of substantially a drum shape, cutting additional rubberized cord fabric plies having a smaller bias angle than the first plies, assembling the second group of plies into a band, building the second band onto the carcass, and ultimately shaping the carcass to substantially toric form.

3. The method of building a pneumatic tire which includes the steps of cutting a plurality of plies of rubberized cord fabric at the same bias angle, forming the plies into several separate bands with the bands being of successively shorter lengths, building the longest band onto a tire building form, giving the second longest band a pull-on stretch to provide it with an increased circumference, and building the second band onto the first-named band.

4. The method of making a pneumatic tire which includes the steps of cutting a plurality of plies of rubberized cord fabric at substantially the same bias angle, assembling the plies into a plurality of bands of substantially the same length, building the bands into substantially a drum shaped tire carcass by applying progressively greater pull-on stretch to each band, cutting a plurality of plies of rubberized fabric at a smaller bias angle than the first group of plies, assembling the plies into a plurality of bands of substantially the same length, and building the bands onto the carcass with a progressively greater pull-on stretch on each band.

5. The method of building a pneumatic tire which includes the steps of cutting a plurality of plies of rubberized cord fabric at the same bias angle, forming the plies into separate bands with the bands being of substantially the same lengths, building a band onto a tire building form, giving a second band a pull-on stretch to provide it with an increased circumference, building the second band onto the first-named band, giving a third band a greater pull-on stretch than the second band and building it on the second-named band, and repeating this operation until the desired number of bands are assembled.

6. That method of building a pnueumatic tire which includes the steps of cutting a plurality of plies of rubberized fabric at the same bias angle, forming the plies into a plurality of bands of substantially the same length, building the bands in turn into a substantially drum shaped carcass by giving each band in turn a greater pull-on stretch than the band beneath, and eventually shaping the carcass to toroidal form.

7. The method of building a pneumatic tire which includes the steps of cutting a plurality of plies of rubberized cord fabric at the same bias angle, assembling the plies into a plurality of bands, building the bands into a tire carcass and applying each band with a greater pull-on stretch than that used on the band beneath, cutting a plurality of plies of rubberized cord fabric at another bias angle less than that at which the first-mentioned plies were cut, assembling the plies into a plurality of bands, building the bands onto the tire carcass in turn with a greater pull-on stretch on each successively applied band, and repeating this operation until a tire carcass having the desired number of plies is constructed.

8. The method of building a pneumatic tire which includes the steps of cutting a plurality of plies of rubberized cord fabric at the same bias angle, assembling the plies into a plurality of bands, building the bands into a tire carcass and applying each band with a greater pull-on stretch than that used on the band beneath, cutting a plurality of plies of rubberized cord fabric at another bias angle less than that at which the first-mentioned plies were cut, assembling the plies into a plurality of bands, and building the bands onto the tire carcass in turn with a greater pull-on stretch on each successively applied band, and eventually shaping the carcass to toroidal form.

JOHN F. PURDY.

REFERENCES CITED

The following references are of record in the file of this patent:

UNITED STATES PATENTS

| Number | Name | Date |
| --- | --- | --- |
| 778,493 | Marks | Dec. 27, 1904 |
| 778,496 | Marks | Dec. 27, 1904 |
| 790,906 | Marks | May 30, 1905 |
| 790,907 | Marks | May 30, 1905 |
| 1,428,040 | Kratz | Sept. 5, 1922 |
| 1,453,865 | Dickinson et al. | May 1, 1923 |
| 1,454,469 | Dickinson et al. | May 8, 1923 |
| 1,493,674 | Hopkinson | May 13, 1924 |
| 1,507,743 | Kratz | Sept. 9, 1924 |
| 1,579,817 | Keith | Apr. 6, 1926 |